US008903658B2

(12) United States Patent  
Marsh et al.

(10) Patent No.: US 8,903,658 B2  
(45) Date of Patent: Dec. 2, 2014

(54) APPARATUS AND METHOD FOR MEASURING DOWNHOLE FLUID COMPOSITION AND PROPERTIES

(75) Inventors: Roger Marsh, Palmyra (AU); David M. Chace, Houston, TX (US); Rafay Z. Ansari, Houston, TX (US); Feyzi Inanc, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 259 days.

(21) Appl. No.: 13/040,332

(22) Filed: Mar. 4, 2011

(65) Prior Publication Data

US 2012/0059587 A1 Mar. 8, 2012

Related U.S. Application Data

(60) Provisional application No. 61/310,961, filed on Mar. 5, 2010.

(51) Int. Cl.  
*G01V 5/04* (2006.01)  
*G01V 5/10* (2006.01)  
*G01V 5/06* (2006.01)

(52) U.S. Cl.  
CPC ............... *G01V 5/104* (2013.01); *G01V 5/107* (2013.01); *G01V 5/06* (2013.01)  
USPC ................................ 702/8; 702/11; 702/13

(58) Field of Classification Search  
USPC .......... 702/8, 11, 12, 13, 50; 208/409; 137/13  
See application file for complete search history.

(56) References Cited

U.S. PATENT DOCUMENTS

| | | | |
|---|---|---|---|
| 3,930,154 A | 12/1975 | Scott | |
| 4,937,446 A | 6/1990 | McKeon et al. | |
| 6,207,953 B1 | 3/2001 | Wilson | |
| 7,361,887 B2 | 4/2008 | Trcka et al. | |
| 7,365,308 B2 | 4/2008 | Trcka et al. | |
| 7,372,018 B2 | 5/2008 | Trcka et al. | |
| 8,471,197 B2* | 6/2013 | Inanc et al. | 250/269.6 |
| 2007/0023623 A1* | 2/2007 | Trcka et al. | 250/269.6 |
| 2008/0308720 A1* | 12/2008 | Ferguson | 250/269.6 |
| 2009/0026359 A1* | 1/2009 | Stephenson et al. | 250/269.7 |
| 2009/0210161 A1* | 8/2009 | Duenckel et al. | 702/8 |
| 2011/0202276 A1* | 8/2011 | Truax et al. | 702/6 |

OTHER PUBLICATIONS

Inanc, et al. "Physical Basis, Modeling, and Interpretation of a New Gas Saturation Measurement for Cased Wells". SPWL 50th Annual Logging Symposium, Jun. 21-24, 2009. pp. 1-14.  
Notification of Transmittal of the International Search Report and the Written Opinion of the International Searching Authority, or the Declaration; PCT/US2011/027201; Sep. 28, 2011.

* cited by examiner

*Primary Examiner* — Michael Nghiem  
*Assistant Examiner* — Ivan Rabovianski  
(74) *Attorney, Agent, or Firm* — Cantor Colburn LLP

(57) ABSTRACT

A method of estimating fluid composition in an earth formation includes: generating at least one pulsed neutron measurement by a pulsed neutron tool; estimating a pulsed neutron fluid saturation by analyzing the at least one pulsed neutron measurement via a pulsed neutron model of the earth formation, the pulsed neutron model including expected pulsed neutron measurements relative to selected fluid composition and properties; comparing the pulsed neutron fluid saturation to a reference fluid saturation estimated via a downhole tool; adjusting the pulsed neutron model to at least substantially eliminate a difference between the pulsed neutron fluid saturation and the reference fluid saturation by adjusting at least one of the selected fluid composition and the selected fluid properties; and estimating at least one of the fluid composition and the fluid properties based on the adjusted model.

20 Claims, 8 Drawing Sheets

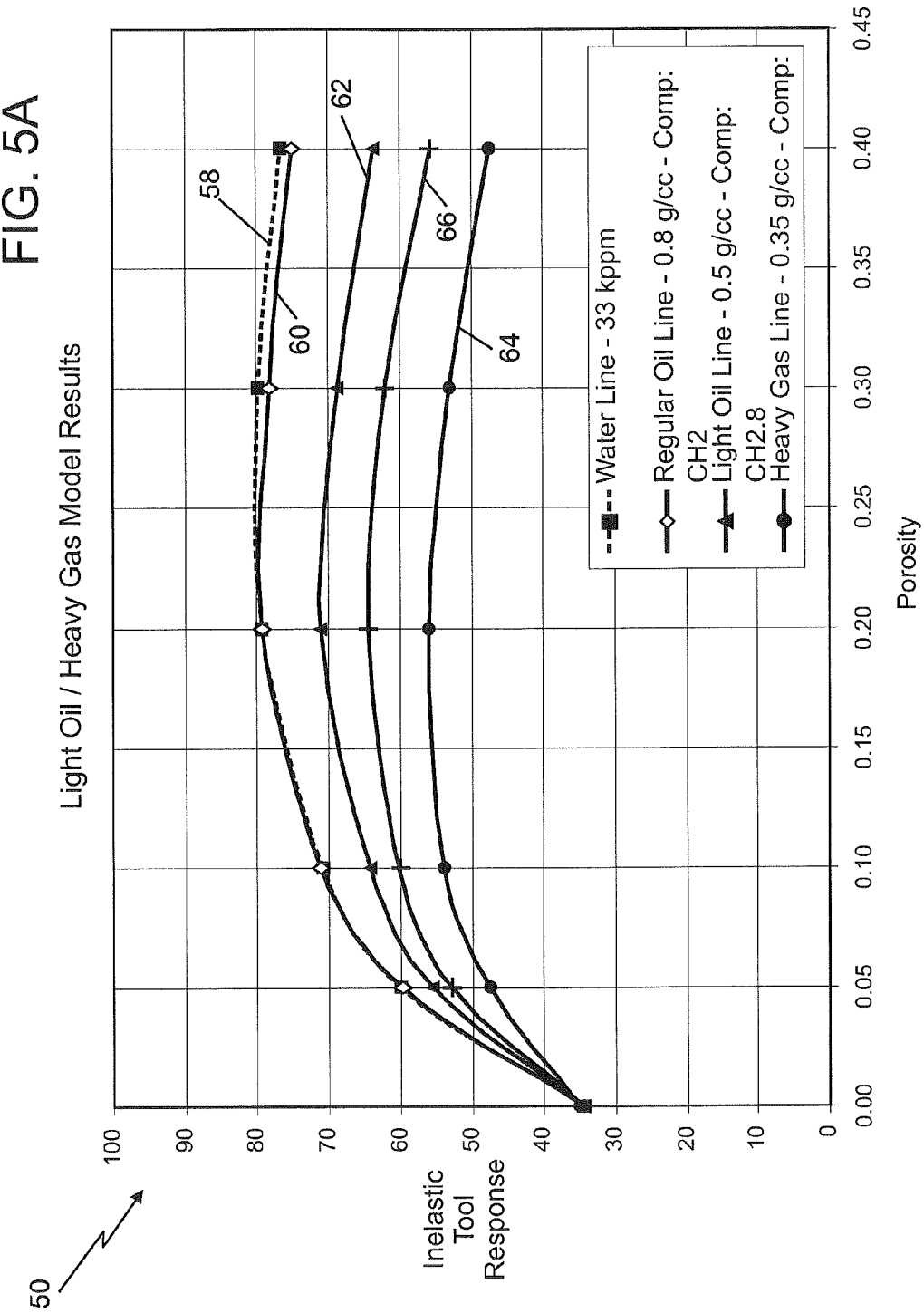

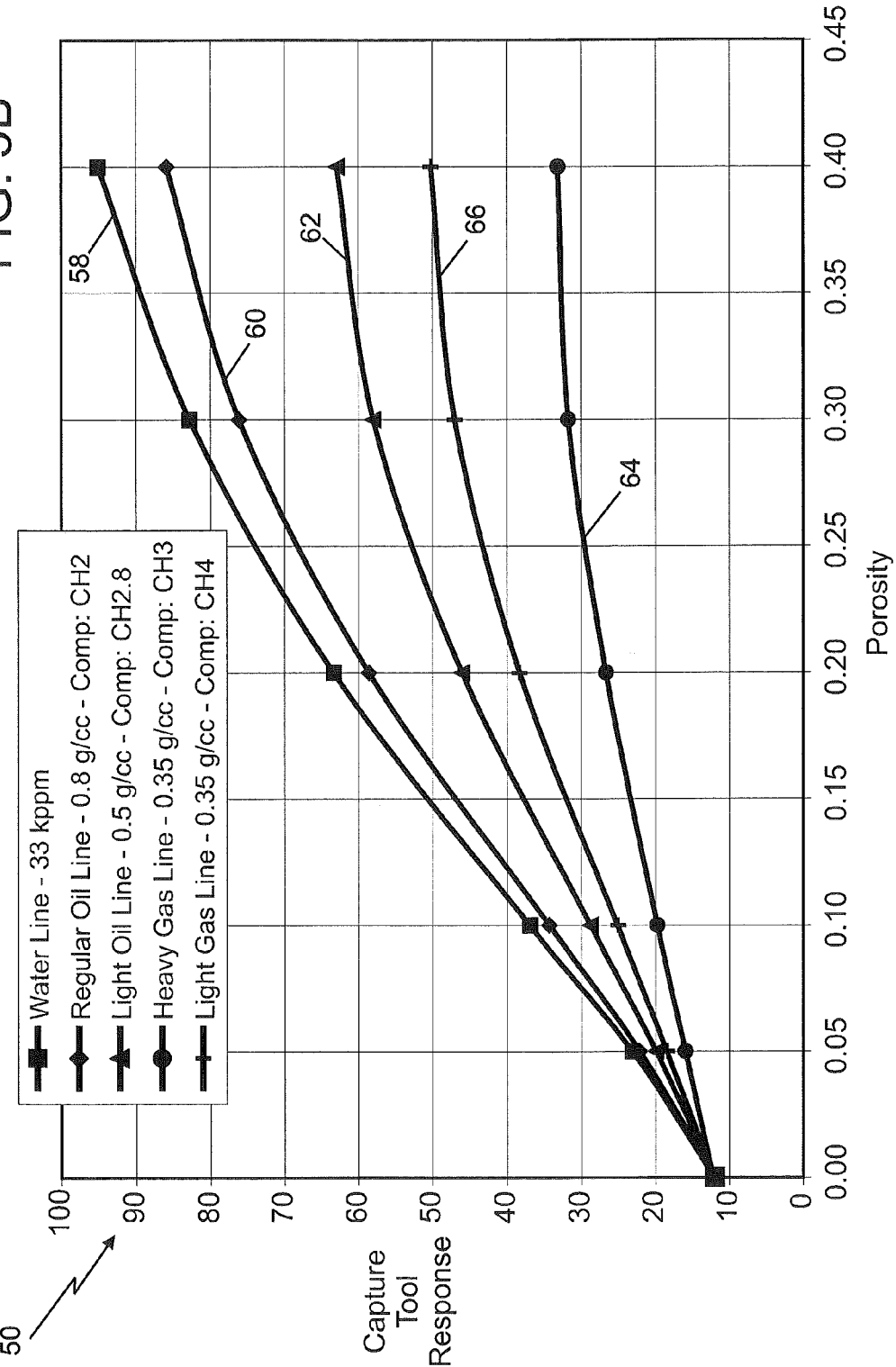

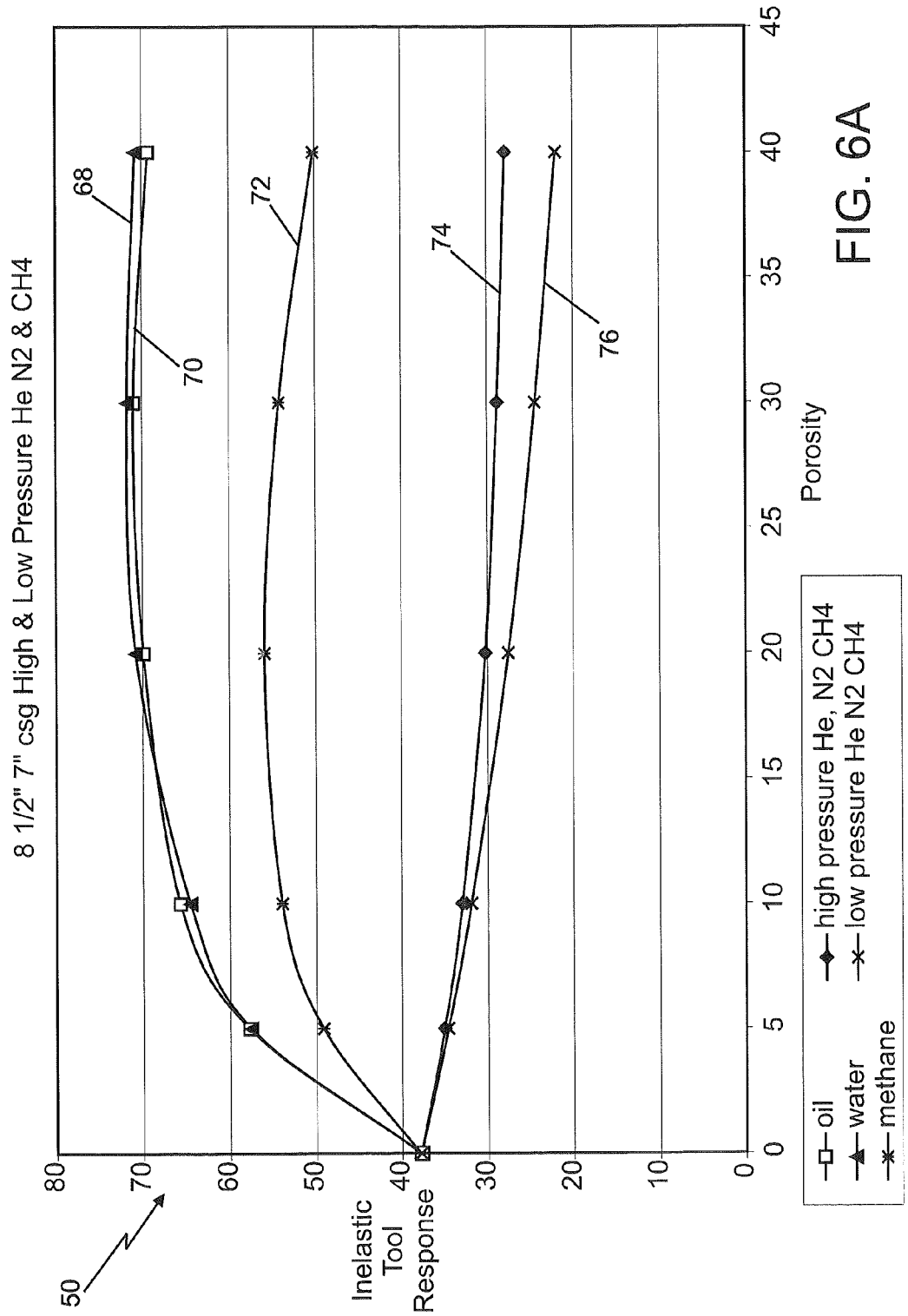

US 8,903,658 B2

APPARATUS AND METHOD FOR MEASURING DOWNHOLE FLUID COMPOSITION AND PROPERTIES

BACKGROUND

In subterranean operations, knowledge of the composition of downhole fluids is important for many processes. The proportions of various types of hydrocarbon fuels and gases, as well as non-hydrocarbon gases, may affect exploration and production processes, as well as surface gas plant designs. Many current petrophysical data acquisition systems (e.g., logging) methods lack the ability to accurately estimate the makeup of such downhole fluids. Conventional petrophysical analysis is generally based on measurements that are sensitive to the presence of water but insensitive or relatively insensitive to hydrocarbon and particularly gas composition. Thus, fluid composition monitoring has typically been qualitative.

SUMMARY

A method of estimating fluid composition in an earth formation includes: generating at least one pulsed neutron measurement by a pulsed neutron tool; estimating a pulsed neutron fluid saturation by analyzing the at least one pulsed neutron measurement via a pulsed neutron model of the earth formation, the pulsed neutron model including expected pulsed neutron measurements relative to selected fluid composition and properties; comparing the pulsed neutron fluid saturation to a reference fluid saturation estimated via a downhole tool; adjusting the pulsed neutron model to at least substantially eliminate a difference between the pulsed neutron fluid saturation and the reference fluid saturation by adjusting at least one of the selected fluid composition and the selected fluid properties; and estimating at least one of the fluid composition and the fluid properties based on the adjusted model.

An apparatus for estimating at least one property of an earth formation includes: a carrier configured to be disposed in the formation; a pulsed neutron tool disposed at the carrier, the pulsed neutron tool including a neutron source configured to irradiate the formation with neutrons and at least one detector configured to measure gamma rays emitted by the formation and generate at least one pulsed neutron measurement; and a processor in communication with the pulsed neutron tool and configured to receive at least one pulsed neutron measurement. The processor is configured to: estimate a pulsed neutron fluid saturation by analyzing at least one pulsed neutron measurement via a pulsed neutron model of the earth formation, the pulsed neutron model including expected pulsed neutron measurements relative to selected fluid composition and properties; compare the pulsed neutron fluid saturation to a reference fluid saturation estimated via a downhole tool; adjust the pulsed neutron model to at least substantially eliminate a difference between the pulsed neutron fluid saturation and the reference fluid saturation by adjusting at least one of the selected fluid composition and the selected fluid properties; and estimate at least one of the fluid composition and the fluid properties based on the adjusted model.

BRIEF DESCRIPTION OF THE DRAWINGS

Referring now to the drawings wherein like elements are numbered alike in the several Figures:

FIGS. 5A and 5B are plots of exemplary pulsed neutron formation models representing multiple hydrocarbon fluid compositions and properties; and FIGS. 6A and 6B are plots of exemplary pulsed neutron formation models representing multiple fluid compositions and properties.

DETAILED DESCRIPTION

Apparatuses and methods for characterizing subterranean formations are described herein. A method of estimating fluid composition includes making a series of measurements using conventional petrophysical data acquisition tools and using these measurements to calculate a first or reference fluid (e.g., water) saturation. At least one pulsed neutron measurement is generated by a pulsed neutron tool and analyzed via a pulsed neutron model of the earth formation to calculate a second fluid saturation, such as a hydrocarbon (e.g., gas and/or oil) saturation. The pulsed neutron model may include assumptions regarding the fluids and gases in the formation. By comparing the reference fluid saturation to the pulsed neutron derived fluid saturation, an assessment can be made of the accuracy of the assumptions made regarding the make up of the formation fluids and gases in the pulsed neutron model. This assessment can then be used to further refine the formation fluids and gases in the model so as to obtain consistency between the first water saturation and the pulsed neutron hydrocarbon saturation.

The apparatuses and methods include the generation of models using pulsed neutron data in conjunction with saturation measurements such as open hole or logging-while-drilling measurements to estimate a composition of formation fluids. Exemplary formation fluids include hydrocarbon fluids such as oil and gas, as well as formation gas including various amounts of hydrocarbon and non-hydrocarbon gases. In one embodiment, the method includes generating one or more fluid saturation measurements (e.g., water, gas and/or hydrocarbon saturation), referred to herein as "pulsed neutron derived fluid saturation", by analyzing pulsed neutron measurements in conjunction with a pulsed neutron model of an earth formation. The pulsed neutron fluid saturation is compared to a second or reference fluid (e.g., water) saturation estimated using one or more conventional downhole tools. The pulsed neutron model is adjusted, for example by iteratively adjusting the types and/or proportions of downhole fluid constituents, based on the comparison, until the pulsed neutron fluid saturation and the reference fluid saturation are at least substantially equal, and the adjusted model is used to estimate the composition of the downhole fluid.

Figure 1:
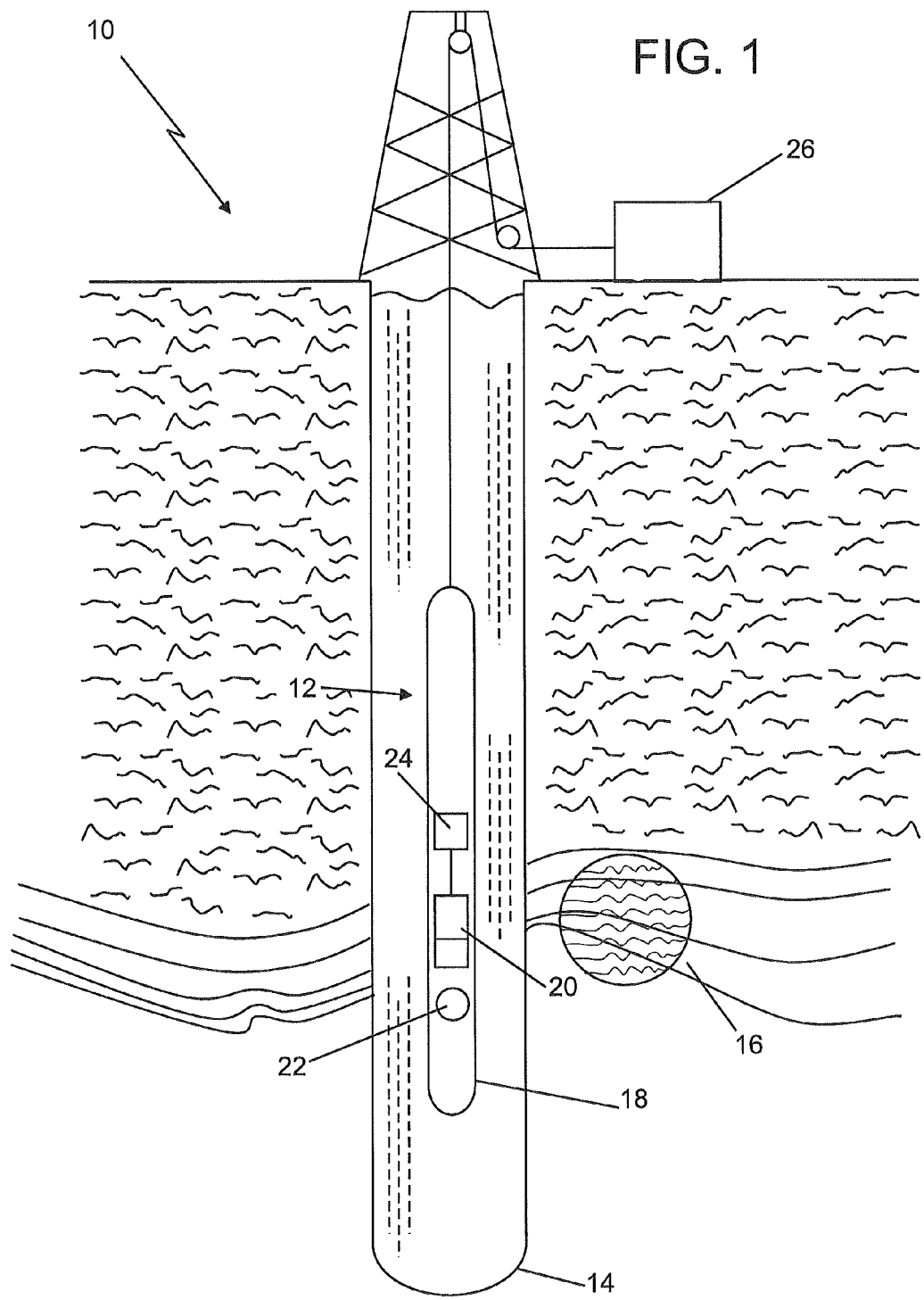
FIG. 1 is a side cross-sectional view of an embodiment of a subterranean well drilling, evaluation, exploration and/or production system.

Referring to FIG. 1, an exemplary embodiment of a subterranean well drilling, evaluation, exploration and/or production system 10 includes a borehole string 12 that is shown disposed in a borehole 14 that penetrates at least one earth formation 16 during a subterranean operation. The borehole 14 may be an open borehole or a cased borehole. In one embodiment, the borehole string includes a downhole tool 18 such as a well logging tool. In this example, the downhole tool 18 is a wireline tool, but is not limited thereto. For example, the downhole tool 18 can be incorporated with a drill string for logging-while-drilling (LWD) applications, such as when the borehole 14 is not completed with a casing. The downhole tool 18 is not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

As described herein, "formations" refer to the various features and materials that may be encountered in a subsurface environment and surround the borehole. Formations include various lithologies such as sand, shale, coal, carbonates, and evaporites. Formations also include various fluids such as water, gas, hydrocarbon fluids such as crude oil, heavy oil and light oil, and flowable solids. Gases may include both hydrocarbon gases such as methane and non-hydrocarbon gases such as carbon dioxide ($CO_2$), helium, hydrogen sulphide ($H_2S$) and nitrogen. In one embodiment, "fluid" refers to any combination of water or other liquids, liquid or flowable hydrocarbons such as oil, heavy oil and light oil, hydrocarbon gases and non-hydrocarbon gases, and condensate. Heavy oil may include crude oil having high viscosity (e.g., above 10 cp) and high specific gravity (e.g., a gravity below 22.3° API). Heavy oils typically have low hydrogen-to-carbon ratios (e.g., less than 2). Light oil may include crude oil having a high API (American Petroleum Institute) gravity (e.g., more than 40°), and typically have relatively high hydrogen-to-carbon ratios (e.g., greater than 2). Hydrocarbon gases may include various combinations of gases such as methane and heavier hydrocarbons including alkanes such as ethane, butane and propane, and others. Water can be fresh or of varying salinities and can include varying concentrations of minerals such as sodium chloride, calcium chloride, boron and others.

In one embodiment, the system 10 includes one or more petrophysical and/or petrochemical downhole tools 18 configured to measure various properties of the borehole 14 and/or the surrounding formation 16. The tool 18 may include or otherwise be utilized in conjunction with any number of measurement tools such as nuclear magnetic resonance (NMR) tools, nuclear neutron, density and natural gamma ray tools, resistivity tools, seismic tools, porosity tools, induction logging tools and others. Such tools may be utilized in an open hole logging process prior to casing, a cased hole logging process and/or a logging-while-drilling (LWD) process. The tool 18 is not limited to the embodiments described herein. In one embodiment, the tool 18 includes any tool or sensor system capable of measuring fluid saturation or providing measurements usable in fluid saturation estimations.

The downhole tool 18, in one embodiment, is configured as a pulsed neutron tool. The tool 18 includes, for example, at least one pulsed neutron source 20 and at least one gamma ray detector 22. In one embodiment, electronics 24 are also included for storing, transmitting and/or processing signals and/or data generated by the gamma ray detector 22. The number of pulsed neutron sources 20 and gamma ray detectors 22 is not limited. In one embodiment, at least one gamma ray detector 22 is configured to detect the presence of gamma rays and gamma ray attributes. Gamma ray detectors are generally capable of generating signals and/or data representative of both inelastic and capture gamma rays.

In one embodiment, the tool 18 is equipped with transmission equipment to communicate ultimately to a surface processing unit 26. Such transmission equipment may take any desired form, and different transmission media and methods may be used. Examples of connections include wired, fiber optic, wireless connections and memory based systems.

Figure 2:
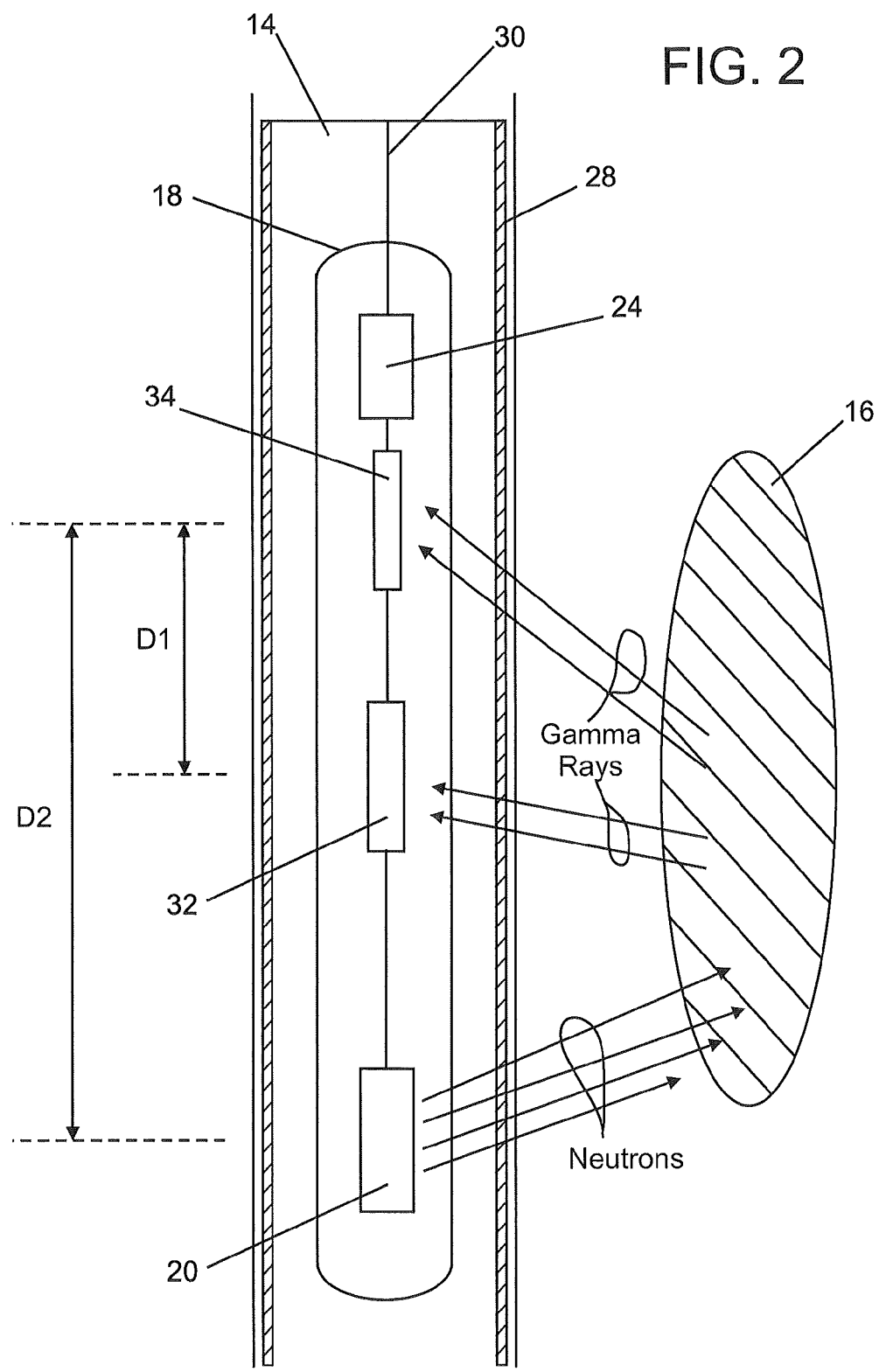
FIG. 2 is a side view of an embodiment of a downhole tool for measuring characteristics and composition of a borehole and/or an earth formation.

Referring to FIG. 2, an exemplary embodiment of the tool 18 includes the pulsed neutron source 20 and one or more gamma ray detectors 22 coupled to the electronics 24. The tool 18, in one embodiment, is configured to be disposed in an open borehole and/or in the borehole after a casing 28 is secured downhole. In one embodiment, the pulsed neutron tool 18 is disposed in the borehole 14 prior to configuring the borehole 14 for production or injection, for example prior to creating perforations or other fluid communication mechanisms in the casing 28 and/or the borehole 14. The tool 18 is shown in FIG. 2 as being disposed in the borehole 14 by a wireline cable 30, however, the tool 18 is not limited thereto.

In one embodiment, the gamma ray detectors 22 include a first detector 32 spaced a first distance (D1) from the neutron source 20. The first detector 32 is configured to detect gamma rays emitted by the formation 16 as a result of irradiation with the neutrons emitted from the neutron source 20. Detecting gamma rays may include detecting gamma ray photons by, for example, counting the photons, measuring the energy of each detected photon, and/or measuring the time of detection with respect to the time of the neutron pulse.

A second detector 34 is spaced a second distance (D2) from the neutron source 20. The second detector 34 is similar to the first detector 32 with respect to detecting gamma rays emitted by the formations 16. In one embodiment, the second distance D2 is greater than the first distance D1. The first detector 32 closest to the neutron source 20 is referred to as a short spaced (SS) detector 32 and the second detector 34 furthest from the neutron source 20 is referred to as an extra long spaced (XLS) detector 34. In some embodiments, at least one additional detector, such as a long spaced (LS) detector, is positioned between the SS detector 32 and the XLS detector 34.

A variety of measurement indicators can be utilized to facilitate analysis of the gamma ray data. For example, various indicators are used to analyze gamma ray detection data from the tool to facilitate estimation of various formation properties. Examples of indicators include inelastic and capture spectra, time and energy spectra, carbon/oxygen ratios, sigma values, inelastic ratios, capture ratios and others. An exemplary indicator is an inelastic measurement indicator such as an inelastic ratio. In one example, the inelastic ratio is the ratio of photons from fast neutron inelastic scattering interactions detected by the SS detector 32 to the photons from inelastic scattering interactions detected by the XLS detector 34. Another exemplary indicator is a capture measurement indicator such as a capture ratio. In one example, the capture ratio is the ratio of photons from thermal neutron capture interactions detected by the SS detector 32 to the capture photons detected by the XLS detector 30.

Figure 3:
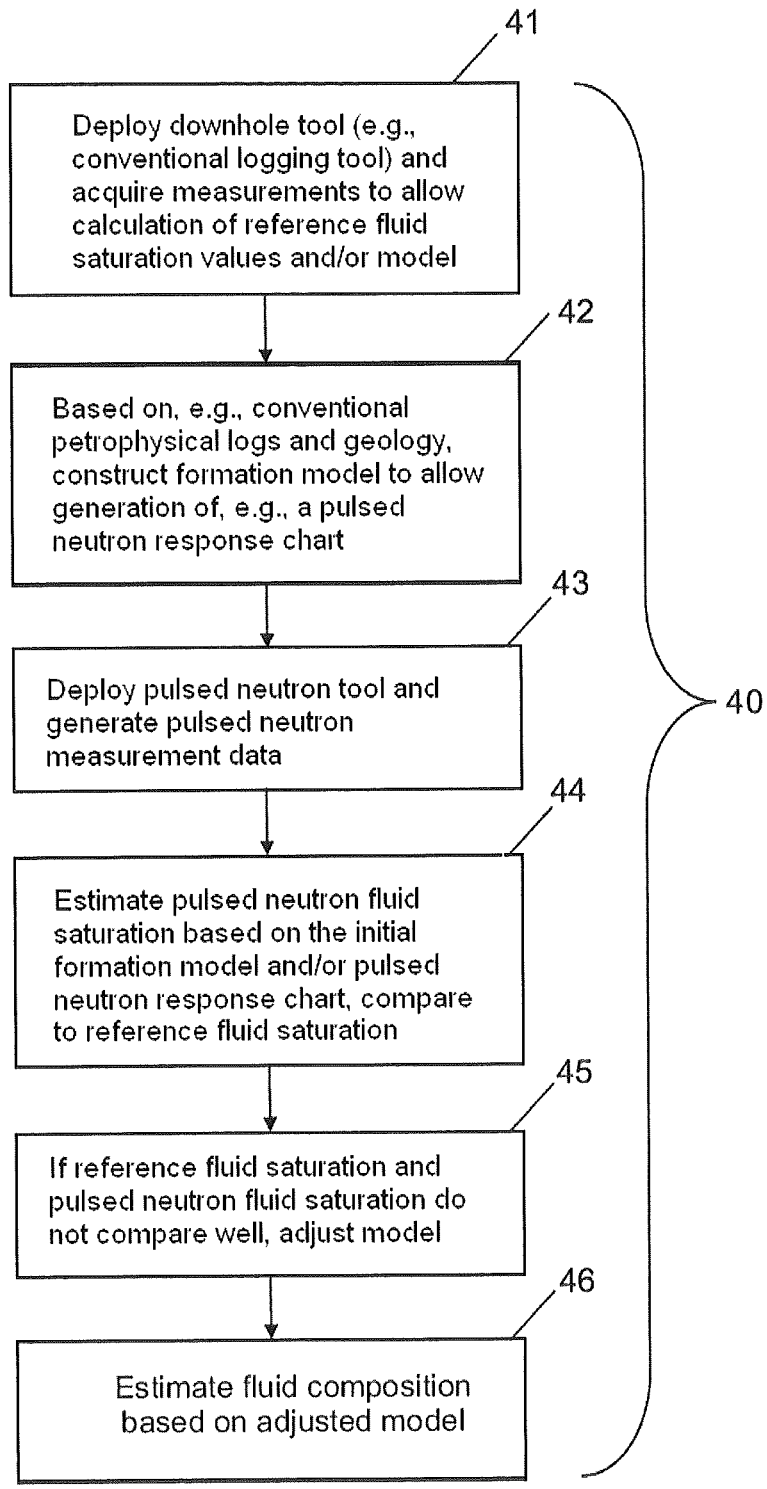
FIG. 3 is a flow chart providing an exemplary method of estimating a downhole fluid composition and properties.

FIG. 3 illustrates a method 40 of characterizing fluids in an earth formation. The method 40 may be performed in conjunction with the system 10 and/or the downhole tool 18, but is not limited thereto. The method 40 may be used in conjunction with any apparatus or configuration capable of taking pulsed neutron measurements. The method 40 includes one or more stages 41-45. In one embodiment, the method 40 includes the execution of all of the stages 41-45 in the order described. However, certain stages may be omitted, stages may be added, or the order of the stages changed.

In the first stage 41, one or more downhole tools 18 are disposed in the borehole 14, and one or more formation evaluation measurements are taken. The borehole 14 may be a cased borehole or an open borehole. Examples of suitable tools 18 include any number of measurement tools such as nuclear magnetic resonance (NMR) tools, nuclear neutron, density and natural gamma ray tools, resistivity tools, seismic tools, porosity tools, induction logging tools and others. In one embodiment, one or more measurements are taken for each of a plurality of borehole depths. The measurement data is analyzed to estimate a property of the formation. In one embodiment, the taking of measurements from the tool 18 is recorded in relation to the depth and/or position of the tool 18, which is referred to as "logging", and a record of such measurements is referred to as a "log". Examples of logging processes that can be performed by the downhole tools 18 include LWD processes, logging measurements after drilling, wireline logging, pipe-conveyed logging operations, drop shot logging and memory logging. The data retrieved during these processes may be transmitted to the surface, and may also be stored with the downhole tool for later retrieval.

The measurements taken are used to generate one or more fluid saturation measurements, referred to herein as "reference fluid saturation". In one embodiment, fluid saturation includes water, oil and/or gas saturation. For example, an induction, density/neutron or gamma ray measurement log is recorded in an open (uncased) borehole. A reference fluid (e.g. gas) saturation log is calculated based on the measurement log.

In the second stage 42, a model of the formation (i.e., "initial model") is generated, which includes expected pulsed neutron measurement values for the formation based on inputted formation properties. Such inputted formation properties include formation lithology, pressure, porosity, water or other fluid content, hydrocarbon fluid content, and constituencies of hydrocarbon fluid (such as oil and gas). For example, the model may include hydrocarbon fluids including various concentrations of materials including hydrocarbons having different hydrogen densities, and/or fluids having different concentrations of hydrocarbon gases and non-hydrocarbon gases such as $CO_2$, helium, $H_2S$ and nitrogen. The model may also include fluid properties such as density and water salinity. The model may also include information regarding geometries and material makeup of downhole tools, casings, borehole strings and other downhole components.

The calculations used to construct the models can be performed via deterministic methods (e.g., the Boltzman transport equation) or simulations such as Monte Carlo based modeling. In one embodiment, the models are Monte Carlo numerical models designed to predict expected measurement values.

In the third stage 43, a pulsed neutron tool is disposed in the borehole 14, such as the pulsed neutron tool 18 shown in FIG. 2. In one embodiment, the borehole 14 is an open borehole or is cased prior to disposing the pulsed neutron tool. A plurality of pulsed neutron measurements are generated, such as inelastic and capture gamma ray spectral measurements, sigma measurements, and carbon/oxygen ratio measurements.

In one embodiment, stage 43 includes estimating the effective or total porosity of the formation at each data point. Porosity can be estimated by any suitable method, including methods using open hole logs and neutron based measurements.

In the fourth stage 44, fluid saturation (i.e., "pulsed neutron fluid saturation") is estimated based on the initial model and the pulsed neutron measurements, and compared to the reference fluid saturation estimated at stage 41. If the pulsed neutron fluid saturation is at least substantially equal to the reference fluid saturation, the model is considered to be accurate, and further action is not necessary. Fluid composition can then be derived from the model. If the pulsed neutron fluid saturation and the reference gas saturation are different, the model is considered to require adjustment.

In the fifth stage 45, if the reference fluid saturation and the pulsed neutron fluid saturation do not match, the initial model is adjusted by adjusting the inputted formation properties. Such properties include the fluid (e.g., water, oil and/or gas) composition such as the types of constituents making up the fluid, properties (e.g., density, salinity) of the fluid constituents and the relative proportions of such constituents in the fluid. The pulsed neutron fluid saturation for this adjusted model is estimated and compared to the reference gas saturation.

This stage may be repeated as necessary by iteratively changing the types, properties and/or proportions of fluid constituents and re-estimating the pulsed neutron fluid saturation until a match with the reference gas saturation is found. A match indicates that the adjusted model accurately represents the gas and/or fluid properties downhole.

In the sixth stage 46, fluid properties such as the fluid composition are determined based on the adjusted model that results in a matched (i.e., at least substantially equal) pulsed neutron fluid saturation and reference fluid saturation. For example, the inputted fluid properties used to construct the adjusted model are considered to be the fluid properties for the borehole and/or the formation.

The following is a non-limiting example of an application of the method 40. In this example, an open hole well logging tool is lowered into a borehole, and an open hole gas saturation log is generated, which defines reference gas saturation values. The borehole is then cased, for example, by lowering pipe segments into the borehole and cementing the pipe segments to form a casing.

A pulsed neutron well logging tool such as a Reservoir Performance Monitor (RPM$^{SM}$), Baker Hughes, Inc. tool is lowered into the cased borehole, and various neutron and gamma ray measurements are performed. Pulsed neutron measurement values such as inelastic ratios are calculated.

Figure 4:
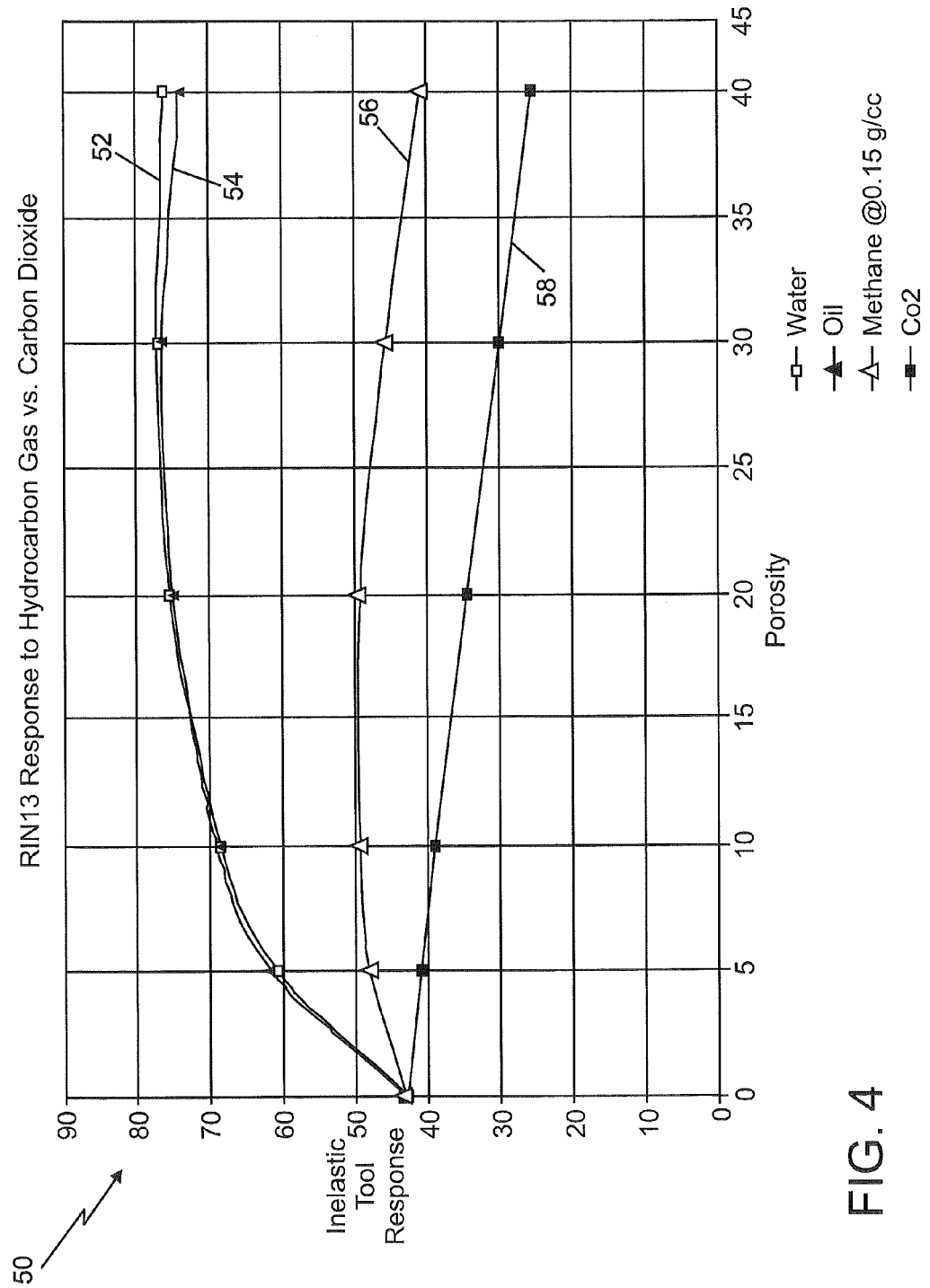
FIG. 4 is a plot of exemplary pulsed neutron formation models representing multiple fluid compositions and properties.

An initial pulsed neutron model, an example of which is shown in FIG. 4, is generated. In this example, multiple alternative models are shown in an inelastic graph or plot 50 that is generated to include expected inelastic values (e.g., inelastic ratio values) for the formation due to properties of the formation, plotted against effective porosity. Effective porosity is shown in this plot as a percentage of the formation.

In this example, the plot 50 includes models showing expected inelastic values for various alternative compositions of the formation. A water line or curve 52 is formed from expected measurement values for water in the formation and borehole having specific properties. An oil line or curve 54 is formed from expected measurement values for oil in the formation and/or borehole.

The plot 50 also includes modeled measurement data reflecting expected values for different gas compositions and properties. A methane line 56 is formed from expected measurement values for gas in the formation consisting entirely of methane (i.e., 100% methane). A $CO_2$ line 58 is formed from expected measurement values for formation gas consisting entirely of $CO_2$. As an illustration, if the actual gas composition of the formation is 100% $CO_2$, than the measured pulsed neutron inelastic value for a given porosity in a gas portion of a formation would coincide with the $CO_2$ line 58.

In this example, the initial formation model ("base case") is generated under the assumption that the gas in the formation and/or borehole is pure (about 100%) methane, and thus the gas line selected in the model is the methane line 56. The pulsed neutron gas saturation is calculated based on inelastic measurement values and the initial model. For example, the measured inelastic data is plotted against the water and oil lines 52, 54 and the methane line 56. Data falling within an "envelope" created between, e.g., the water line 52 and the methane line 56 is compared to the model. Data falling closer to the methane line indicates a higher methane saturation.

The pulsed neutron gas saturation is then compared to the reference gas saturation. If the pulsed neutron gas saturation (in this case based on an assumption that the gas is pure methane) matches the reference gas saturation, the initial model is considered to be accurate and confirms that the downhole gas is pure methane.

If the pulsed neutron gas saturation is different (in this case, significantly greater) than the reference gas saturation, the actual gas composition (e.g., the presence of other gases such as $CO_2$) has not been accounted for. An adjusted model is generated by adjusting the assumed composition of the downhole gas. In this example, the adjusted model is generated using an assumption that the downhole gas is $CO_2$ gas. The only gas line in this adjusted model is the $CO_2$ line 56. An adjusted pulsed neutron gas saturation is estimated based on the adjusted model and compared to the reference gas saturation. In this example, the adjusted pulsed neutron gas saturation is found to be less than the reference gas saturation.

Next, additional adjusted models, each reflecting different proportions of methane and $CO_2$ are iteratively used to estimate additional pulsed neutron gas saturations, and the additional pulsed neutron gas saturations are compared to the reference saturation until a match is found. The final model that results in a pulsed neutron gas saturation that is at least substantially equal to the reference gas saturation is considered to be accurate, and the gas properties and constituent proportions used in the final model are considered to be the correct properties and proportions.

Although the above example is shown as determining a proportion of a non-hydrocarbon gas, the method is not so limited. Additional gas constituents can be estimated, such as various hydrocarbon gases and other non-hydrocarbon gases such as nitrogen, $H_2S$ and helium. In addition, various fluid constituents can be estimated using the methods described herein, such as various hydrocarbon fluids including different types of crude oil (e.g., heavy oil and light oil), hydrocarbon fluids and/or gases having different hydrogen densities, and water of different salinities.

In one example, the reference fluid is a water saturation estimated using a downhole tool 18. In this example, the water saturation is compared to a pulsed neutron hydrocarbon saturation (e.g., the pulsed neutron gas saturation) by deriving a pulsed neutron water saturation from the pulsed neutron hydrocarbon saturation. For example, in a two phase system in which the formation includes substantially only oil (or gas) and water, the pulsed neutron water saturation (Sw) is derived from the pulsed neutron gas saturation (Shc) based on the relationship: Shc=1−Sw. If the formation is (or is assumed to be) a three-phase system including oil, gas and water, the pulsed neutron water saturation can be derived based on estimations of oil and gas from measurements and the model. If other fluids (e.g., non-hydrocarbon gases) are present, the model may be altered to account for the other fluids.

An alternative example of the model 50 is shown in FIGS. 5A and 5B. FIGS. 5A and 5B illustrate inelastic and capture plots, respectively, relative to effective porosity. In this example, the relative porosity is shown as a fraction of the formation. The model 50 includes a water line 58 representing formation water having a 33 kilo parts-per-million (kppm) salinity. A "regular oil" line 60 represents formation fluid consisting of oil having a density of 0.8 g/cc and a hydrogen/carbon ratio of two ("CH2") and a "light oil" line 62 represents formation fluid consisting of oil having a density of 0.5 g/cc and a hydrogen/carbon ratio of 2.8 ("CH2.8"). A "heavy gas" line 64 represents formation fluid consisting of gas having a density of 0.35 g/cc and a hydrogen/carbon ratio of three ("CH3") and a "light gas" line 66 represents formation fluid consisting of methane gas having a density of 0.35 g/cc and a hydrogen/carbon ratio of four ("CH4").

Figure 6B:
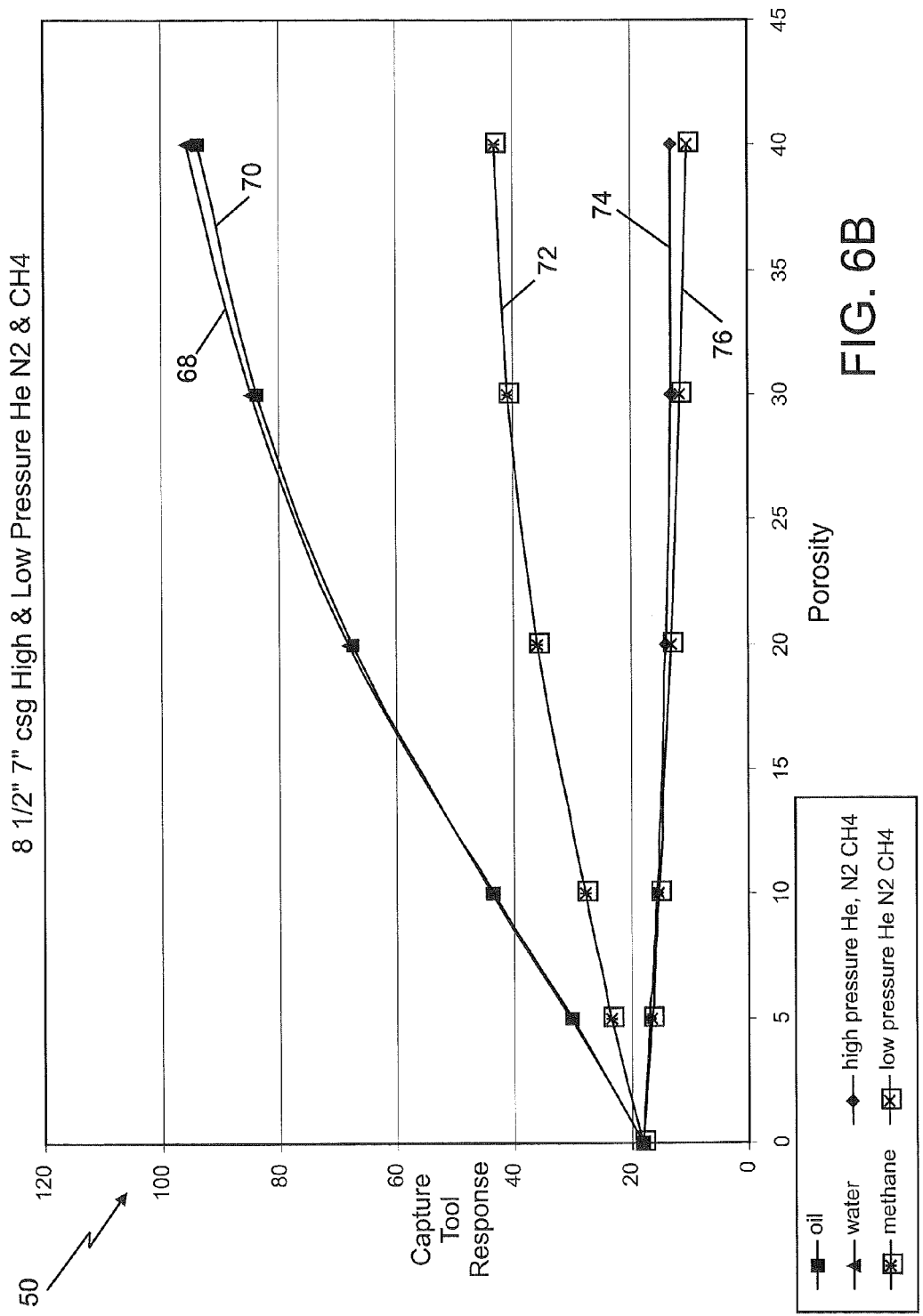

Another alternative example of the model 50 is shown in FIGS. 6A and 6B. FIGS. 6A and 6B illustrate inelastic and capture plots, respectively, relative to effective porosity. In this example, the relative porosity is shown as a fraction of the formation. The model 50 includes a water line 68 representing formation water. An oil line 70 represents formation fluid consisting of oil having selected properties such as density and composition. A methane line 72 represents formation fluid consisting of methane gas. A high pressure gas line 74 represents formation fluid consisting of a combination of methane, helium and nitrogen gases at selected proportions. For example, the proportions of constituents of the high pressure gas are 6% helium, 40% nitrogen and 54% methane. A low pressure gas line 76 represents formation fluid consisting of lower pressure methane, helium and nitrogen gases at selected proportions.

The models described herein are illustrative of exemplary formation properties, borehole properties and measurements, and are thus not limited to the types of formations or formation properties described herein. The models are described based on selected parameters such as formation fluid constituent concentrations. The models may also be generated or selected using additional known and/or measured information, such as known formation constituents, borehole and downhole tool sizes and configurations, as well as borehole fluids, casing materials and downhole tool materials.

The apparatuses and methods described herein have various advantages over prior art apparatuses and techniques. The apparatuses and methods allow for the generation of improved models, which result in more accurate estimations of formation properties, particularly oil, gas and other fluid composition. For example, the apparatuses and methods allow for adjustment of formation models to accurately reflect formation properties.

Various gas and/or fluid constituencies may be reliably estimated based on the apparatuses and methods described herein. For example, the apparatuses and methods allow for differentiation between various types of hydrocarbons, hydrocarbon gases and between hydrocarbon and non-hydrocarbon gases such as nitrogen, $CO_2$, $H_2S$, helium and others.

In connection with the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A method of estimating fluid composition in an earth formation, comprising:
   generating at least one pulsed neutron measurement by a pulsed neutron tool;
   estimating a pulsed neutron fluid saturation by analyzing the at least one pulsed neutron measurement via a pulsed neutron model of the earth formation, the pulsed neutron model including expected pulsed neutron measurements relative to selected fluid properties, the selected fluid properties including a composition of gas in the fluid, wherein estimating includes selecting a proportion of a non-hydrocarbon gas in the fluid for the pulsed neutron model;
   comparing the estimated pulsed neutron fluid saturation to a reference fluid saturation estimated via a downhole tool;
   adjusting the pulsed neutron model to at least substantially eliminate a difference between the pulsed neutron fluid saturation and the reference fluid saturation by adjusting at least the proportion of the non-hydrocarbon gas in the fluid; and
   estimating fluid properties based on the adjusted model.

2. The method of claim 1, wherein the reference fluid saturation is estimated by disposing the downhole tool in an open borehole.

3. The method of claim 1, wherein generating the at least one pulsed neutron measurement includes disposing the pulsed neutron tool in at least one of an open borehole and a cased borehole.

4. The method of claim 1, wherein adjusting the pulsed neutron model includes iteratively adjusting a proportion of at least two types of constituent gases in the fluid.

5. The method of claim 1, wherein the composition of gas in the fluid includes the proportion of the hydrocarbon gas, and a proportion of a non-hydrocarbon gas.

6. The method of claim 5, wherein the hydrocarbon gas includes one or more hydrocarbon gases having different hydrogen-carbon ratios.

7. The method of claim 5, wherein the non-hydrocarbon gas is selected from at least one of nitrogen, carbon dioxide, hydrogen sulphide and helium.

8. The method of claim 5, wherein the hydrocarbon gas is at least one of methane, ethane, and higher order alkanes.

9. The method of claim 1, wherein the at least one pulsed neutron measurement is selected from at least one of a time spectrum, an inelastic spectrum, a capture spectrum, a sigma value and a carbon/oxygen ratio.

10. The method of claim 1, wherein the pulsed neutron tool includes a neutron source, a first detector located at a first distance from the neutron source and a second detector located at a second distance from the neutron source, the second distance being greater than the first distance.

11. The method of claim 10, wherein the at least one pulsed neutron measurement is at least one of a ratio of inelastic measurements from the first detector to inelastic measurements from the second detector and a ratio of capture measurements from the first detector to capture measurements from the second detector.

12. An apparatus for estimating at least one property of an earth formation, comprising:
   a carrier configured to be disposed in the formation;
   a pulsed neutron tool disposed at the carrier, the pulsed neutron tool including a neutron source configured to irradiate the formation with neutrons and at least one detector configured to measure gamma rays emitted by the formation and generate at least one pulsed neutron measurement; and
   a processor in communication with the pulsed neutron tool and configured to receive the at least one pulsed neutron measurement, the processor configured to:
   estimate a pulsed neutron fluid saturation by analyzing the at least one pulsed neutron measurement via a pulsed neutron model of the earth formation, the pulsed neutron model including expected pulsed neutron measurements relative to selected fluid properties, the selected fluid properties including a composition of gas in the fluid, wherein estimating includes selecting a proportion of a non-hydrocarbon gas in the fluid for the pulsed neutron model;
   compare the pulsed neutron fluid saturation to a reference fluid saturation estimated via a downhole tool;
   adjust the pulsed neutron model to at least substantially eliminate a difference between the pulsed neutron fluid saturation and the reference fluid saturation by adjusting at least the proportion of the non-hydrocarbon gas in the fluid; and
   estimate fluid properties based on the adjusted model.

13. The apparatus of claim 12, wherein the downhole tool is configured to be disposed in an open borehole, and the pulsed neutron tool is configured to be disposed in at least one of the open borehole and the borehole after the borehole has been cased.

14. The apparatus of claim 12, wherein the at least one pulsed neutron measurement is selected from at least one of a time spectrum, an inelastic spectrum, a capture spectrum, a sigma value and a carbon/oxygen ratio.

15. The apparatus of claim 12, wherein the pulsed neutron tool includes a neutron source, a first detector located at a first distance from the neutron source and a second detector located at a second distance from the neutron source, the second distance being greater than the first distance.

16. The apparatus of claim 15, wherein the at least one pulsed neutron measurement is at least one of a ratio of inelastic measurements from the first detector to inelastic measurements from the second detector and a ratio of capture measurements from the first detector to capture measurements from the second detector.

17. The apparatus of claim 12, wherein the processor is configured to adjust the model by iteratively adjusting a proportion of at least two types of constituent gases in the fluid.

18. The apparatus of claim 12, wherein the composition of the gas in the fluid includes the proportion of the hydrocarbon gas, and a proportion of a non-hydrocarbon gas.

19. The apparatus of claim 18, wherein the hydrocarbon gas includes one or more hydrocarbon gases having different hydrogen-carbon ratios.

20. The apparatus of claim 18, wherein the non-hydrocarbon gas is selected from at least one of nitrogen, carbon dioxide, hydrogen sulphide and helium.

\* \* \* \* \*